US 11,029,788 B2
Jun. 8, 2021

United States Patent
Park et al.

(54) DISPLAY DEVICE INCLUDING A FORCE SENSOR

(71) Applicant: SAMSUNG DISPLAY CO., LTD., Yongin-si (KR)

(72) Inventors: Sungun Park, Suwon-si (KR); Youngjoo Lee, Busan (KR); Heekwon Lee, Asan-si (KR); Jeongil Yoo, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/523,455

(22) Filed: Jul. 26, 2019

(65) Prior Publication Data

US 2020/0033970 A1 Jan. 30, 2020

(30) Foreign Application Priority Data

Jul. 27, 2018 (KR) ........................ 10-2018-0087749

(51) Int. Cl.
*G06F 3/041* (2006.01)
*G06F 3/044* (2006.01)

(52) U.S. Cl.
CPC .... *G06F 3/044* (2013.01); *G06F 2203/04102* (2013.01); *G06F 2203/04105* (2013.01)

(58) Field of Classification Search
CPC . G06F 2203/04102; G06F 2203/04105; G06F 3/044; G06F 3/041–0436; G06F 2203/041–04109
USPC ................................................. 345/173–178
See application file for complete search history.

(56) References Cited

U.S. PATENT DOCUMENTS

| | | | | |
|---|---|---|---|---|
| 6,380,918 B1* | 4/2002 | Chiba | ................. | G02F 1/13452 345/90 |
| 6,449,082 B1* | 9/2002 | Agrawal | ................. | G02F 1/155 250/214 SG |
| 8,039,753 B2* | 10/2011 | Jang | ........................ | H05K 1/189 174/254 |
| 9,857,913 B2 | 1/2018 | Day | | |
| 2003/0121766 A1* | 7/2003 | Chen | ........................ | G06F 3/045 200/310 |
| 2009/0322696 A1* | 12/2009 | Yaakoby | ................. | G06F 3/041 345/173 |
| 2011/0115739 A1* | 5/2011 | Song | ........................ | G06F 3/041 345/174 |
| 2011/0157087 A1* | 6/2011 | Kanehira | ................ | G06F 3/041 345/174 |

(Continued)

FOREIGN PATENT DOCUMENTS

| KR | 10-2017-0038479 | 4/2017 |
|---|---|---|
| KR | 10-1729197 | 4/2017 |
| KR | 10-2017-0087097 | 7/2017 |

*Primary Examiner* — Roy P Rabindranath
(74) *Attorney, Agent, or Firm* — F. Chau & Associates, LLC

(57) ABSTRACT

A display device including: a display panel; a printed circuit board connected to the display panel; an elastic element disposed between the display panel and the printed circuit board; a first conductor disposed between the elastic element and the printed circuit board; and a second conductor disposed between the elastic element and the display panel, and forming a capacitance with the first conductor, wherein the printed circuit board includes a first pad connected to the first conductor.

24 Claims, 8 Drawing Sheets

(56) References Cited

U.S. PATENT DOCUMENTS

| | | | |
|---|---|---|---|
| 2013/0016049 A1* | 1/2013 | Eom | G06F 3/0412 |
| | | | 345/173 |
| 2014/0118967 A1* | 5/2014 | Lee | G06F 3/041 |
| | | | 361/749 |
| 2015/0153764 A1* | 6/2015 | Park | G06F 3/0416 |
| | | | 345/173 |
| 2015/0220193 A1* | 8/2015 | Choe | G06F 3/044 |
| | | | 345/174 |
| 2016/0259465 A1* | 9/2016 | Agarwal | G06F 3/0418 |
| 2017/0090637 A1 | 3/2017 | Yoon et al. | |
| 2017/0192461 A1* | 7/2017 | Park | G06F 3/0447 |
| 2017/0205924 A1 | 7/2017 | Kim et al. | |
| 2017/0242523 A1 | 8/2017 | Hoch et al. | |
| 2017/0285830 A1 | 10/2017 | Choi | |
| 2018/0196991 A1* | 7/2018 | Choi | G06F 3/04845 |
| 2019/0302892 A1* | 10/2019 | Takei | G06F 3/0488 |
| 2020/0109995 A1* | 4/2020 | Kitada | H01L 41/047 |
| 2020/0241701 A1* | 7/2020 | Nakayama | G06F 3/0446 |

\* cited by examiner

DISPLAY DEVICE INCLUDING A FORCE SENSOR

CROSS-REFERENCE TO RELATED APPLICATION

This application claims priority under 35 U.S.C. § 119 to Korean Patent Application No. 10-2018-0087749, filed on Jul. 27, 2018, in the Korean Intellectual Property Office (KIPO), the disclosure of which is incorporated by reference herein in its entirety.

1. TECHNICAL FIELD

The present invention relates to a display device, and more particularly, to a display device including a force sensor.

2. DISCUSSION OF RELATED ART

Display devices may include liquid crystal display ("LCD") devices, organic light emitting diode ("OLED") display devices, plasma display panel ("PDP") devices, electrophoretic display devices, or the like.

These display devices may include a force sensor for sensing a pressure when a screen is touched as well as a touch sensor for sensing an input when the screen is touched.

The force sensor may be disposed on a back surface of a display panel or on one surface of a printed circuit board ("PCB") that is disposed on the back surface of the display panel. The force sensor and the PCB may be connected to each other using a separate flexible printed circuit board ("FPCB"). A signal for driving the force sensor or a signal output by the force sensor is transmitted from the PCB or to the PCB through the FPCB.

However, such a force sensor may have an unstable connection with the PCB and a complicated structure.

SUMMARY

According to an exemplary embodiment of the present invention, a display device includes: a display panel; a printed circuit board connected to the display panel; an elastic element disposed between the display panel and the printed circuit board; a first conductor disposed between the elastic element and the printed circuit board; and a second conductor disposed between the elastic element and the display panel, and forming a capacitance with the first conductor. The printed circuit board includes a first pad connected to the first conductor.

The printed circuit board may include a cover layer having an opening corresponding to the first pad. The first conductor may be connected to the first pad through the opening.

The first conductor may include a plurality of conductors separated from each other.

The first conductor may be a conductive tape.

The conductive tape may include an adhesive layer, a conductive layer, and an insulating layer.

The first conductor may include a conductive paste.

The first pad may contact the first conductor.

The first pad may overlap the first conductor in a plan view.

The first pad may be connected to a sensor controller configured to measure a change in the capacitance.

The printed circuit board may include a second pad that is connected to the second conductor and to which a ground voltage is applied.

The printed circuit board may include a cover layer having an opening corresponding to the second pad.

The display device may further include a conductive tape or a conductive sponge that contacts the second pad and the second conductor.

The second conductor may include a sheet that overlaps an entire surface of a display area of the display panel.

The second conductor may include a heat radiation sheet.

The printed circuit board may include a shielding layer that overlaps the first conductor in a plan view.

The display device may further include a bracket configured to support the display panel and the printed circuit board.

According to an exemplary embodiment of the present invention, a display device includes: a display panel; a printed circuit board connected to the display panel; an elastic element disposed between the display panel and the printed circuit board; and a first conductor disposed between the elastic element and the display panel. The printed circuit board includes a second conductor that forms a capacitance with the first conductor.

The second conductor may be connected to a sensor controller configured to measure a change in the capacitance.

The printed circuit board may include a plurality of wiring layers separated from each other by an insulating layer. The second conductor may be disposed at a first wiring layer that is closest to the display panel among the plurality of wiring layers.

The printed circuit board may include a shielding layer that is disposed at a second wiring layer adjacent to the first wiring layer, and overlaps the second conductor in a plan view.

The printed circuit board may include a first pad that is connected to the first conductor and to which a ground voltage is applied.

The printed circuit board may include a cover layer having an opening corresponding to the first pad.

The display device may further include a conductive tape or a conductive sponge that contacts the first pad and the first conductor.

The first conductor may include a sheet that overlaps an entire surface of a display area of the display panel.

The first conductor may include a heat radiation sheet.

The display device may further include a bracket configured to support the display panel and the printed circuit board.

According to an exemplary embodiment of the present invention, a display device includes: a display panel; a printed circuit board connected to the display panel; a sensing electrode disposed adjacent to the printed circuit board; a conductive sheet disposed adjacent to the display panel; and an elastic element disposed between the sensing electrode and the conductive sheet, wherein the printed circuit board comprises a pad connected to the sensing electrode.

BRIEF DESCRIPTION OF THE DRAWINGS

The above and other features of the present invention will become more apparent by describing in detail exemplary embodiments thereof with reference to the accompanying drawings, wherein.

DETAILED DESCRIPTION OF THE EMBODIMENTS

Figure 1:
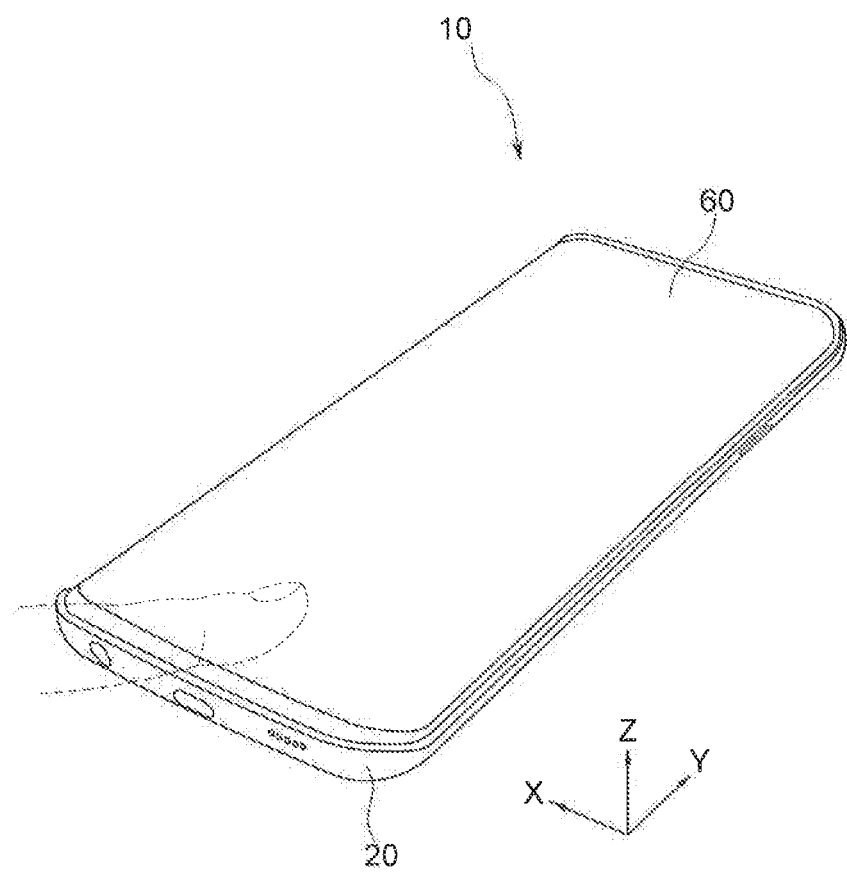
FIG. 1 is a perspective view illustrating a display device according to an exemplary embodiment of the present invention.

Exemplary embodiments of the present invention will now be described more fully hereinafter with reference to the accompanying drawings. The present invention may, however, be embodied in many different forms and should not be construed as being limited to the exemplary embodiments set forth herein.

In the drawings, thicknesses of a plurality of layers and areas may be illustrated in an enlarged manner for clarity and case of description thereof. When a layer, area, or plate is referred to as being "on" another layer, area, or plate, it may be directly on the other layer, area, or plate, or intervening layers, areas, or plates may be present therebetween. In the drawings, like reference numerals may refer to like elements.

Throughout the specification, when an element is referred to as being "connected" to another element, the element may be "directly connected" to the other element, or "electrically connected" to the other element with one or more intervening elements interposed therebetween.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Herein, a display device is assumed to be an organic light emitting diode ("OLED") display device, but exemplary embodiments of the present invention are not limited thereto, and the display device according to an exemplary embodiment of the present invention may be a liquid crystal display ("LCD") device or a plasma display device.

Hereinafter, exemplary embodiments of the present invention will be described with reference to FIGS. 1 to 12.

A display device according to exemplary embodiments of the present invention may include, for example, a smartphone, a tablet personal computer ("PC"), a mobile phone, a video phone, an e-book reader, a desktop PC, a laptop PC, a netbook computer, a workstation, a server, a personal digital assistant ("PDA"), a portable multimedia player ("PMP"), an MP3 player, a mobile medical apparatus, a camera, or a wearable device. According to exemplary embodiments of the present invention, the wearable device may be of a type of accessory (e.g., a watch, a ring, a bracelet, an anklet, a necklace, a pair of glasses, a contact lens or a head-mounted device ("HMD")), a textile or clothing attached type (e.g., electronic apparel), a body attached type (e.g., skin pads or tattoos), or a bio-implantable type (e.g., implantable circuits).

In exemplary embodiments of the present invention, the display device may be one of the various devices described above or a combination thereof. The display device according to an exemplary embodiment of the present invention may be a flexible display device. Herein, the display device according to an exemplary embodiment of the present invention is not limited to the above-described devices, and may include a new display device according to technological advancement.

Hereinafter, display devices according to exemplary embodiments of the present invention will be described with reference to the accompanying drawings. As used herein, the term "user" may refer to a person using the display device or a device using the display device (e.g., an artificial intelligence ("AI") display device).

Figure 2:
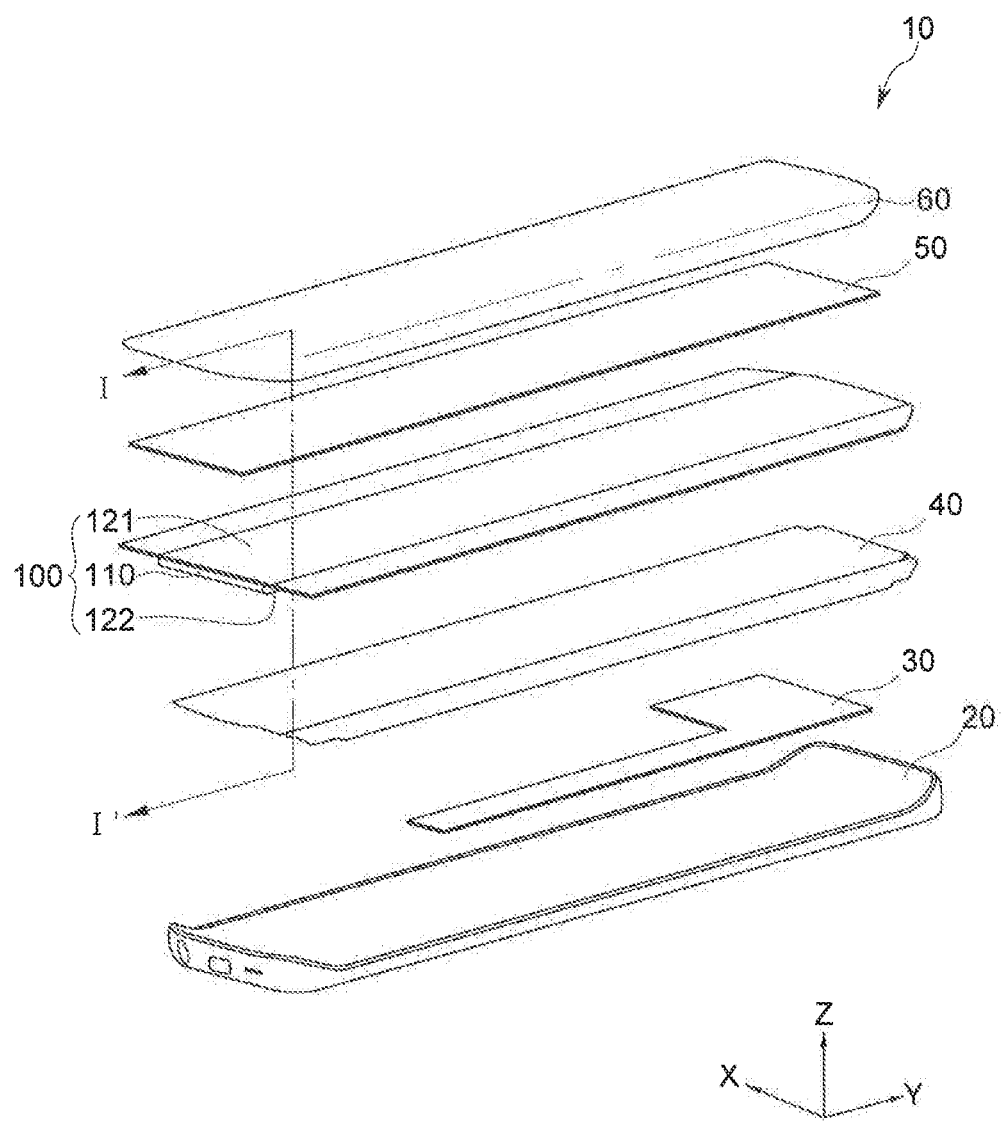
FIG. 2 is an exploded perspective view illustrating the display device illustrated in FIG. 1.

FIG. 1 is a perspective view illustrating a display device according to an exemplary embodiment of the present invention, and FIG. 2 is an exploded perspective view illustrating the display device illustrated in FIG. 1.

Referring to FIGS. 1 and 2, a display device 10 according to an exemplary embodiment of the present invention includes a housing 20, a main circuit board 30, a bracket 40, a display panel 100, a polarizing film 50, and a cover window 60. According to exemplary embodiments of the present invention, the display device 10 may not include some of the components illustrated in FIGS. 1 and 2, or may further include components not illustrated in FIGS. 1 and 2.

The cover window 60 may transmit light generated by the display panel 100. In addition, on the cover window 60, a user may perform a touch action (including a force touch) by contacting the cover window 60 using a part of their body (or a touch pen). In addition, the cover window 60 has liquidity so that the force touch (e.g., touch pressure) may be transmitted to a touch sensor 300 to be described below. The cover window 60 may include a flexible material that may be bent, e.g., tempered glass, reinforced plastic, or a polymer material. According to exemplary embodiments of the present invention, the cover window 60 may be referred to as a glass window.

The display panel 100, a printed circuit board ("PCB") 200, and the force sensor 300 are disposed below the cover window 60, for example, between the cover window 60 and the bracket 40 to be described below. In addition, the display panel 100 may be electrically connected to the main circuit board 30 through the PCB 200 and outputs content (e.g., text, images, videos, icons, widgets, or symbols). In addition, the force sensor 300 may be electrically connected to the main circuit board 30 through the PCB 200, receive a touch pressure (e.g., force touch) from the user, and output information corresponding to the touch pressure to the main circuit board 30.

The force sensor 300 includes a first conductor, a second conductor forming a capacitance with the first conductor, and an elastic element disposed between the first conductor and the second conductor. The first conductor may be a sensing electrode 330 disposed on or in the PCB 200. The second conductor may be a conductive sheet 310 attached to a back surface of the display panel 100. Hereinafter, the first conductor may be referred to as the sensing electrode 330, and the second conductor may be referred to as the conductive sheet 310. The display panel 100, the PCB 200, and the force sensor 300 will be described below with reference to FIGS. 3, 4A, and 4B.

According to an exemplary embodiment of the present invention, the display panel 100 may include a liquid crystal display ("LCD") panel, a light emitting diode ("LED") display panel, an organic light emitting diode ("OLED") display panel, a microelectromechanical systems (MEMS) display panel or an electronic paper display panel. The display panel 100 may have flexibility.

The PCB 200 may have a wiring structure configured such that the main circuit board 30 is electrically connected to the force sensor 300 and the display panel 100. The PCB 200 may be a flexible printed circuit board ("FPCB") or a rigid PCB. In addition, a sensor controller 380 for controlling the force sensor 300 may be formed as an integrated circuit ("IC") chip and mounted on the PCB 200 or the main circuit board 30.

The bracket 40 supports the display panel 100, the PCB 200, and the force sensor 300. Accordingly, an elastic element 320 of the force sensor 300 may be contracted due to a touch pressure applied to the cover window 60. The bracket 40 includes, for example, a magnesium alloy, and may be disposed on the main circuit board 30. According to an exemplary embodiment of the present invention, a through hole may be provided at the bracket 40, through which a part of the PCB 200 may pass through. In addition, according to an exemplary embodiment of the present invention, a swelling gap may be provided at the bracket 40, to accommodate swelling of the battery due to aging. According to exemplary embodiments of the present invention, the through hole may be referred to in various terms such as a via hole, an opening, or an opening part.

The main circuit board 30 may be disposed below the bracket 40, and may be electrically connected to the PCB 200 and the display panel 100 through a connector or a wiring. The main circuit board 30 may be a rigid PCB, for example. According to an exemplary embodiment of the present invention, various electronic components, elements, printed circuits, and the like of the display device 10 may be mounted or arranged on the main circuit board 30. The main circuit board 30 may be referred to as a main board, a printed board assembly ("PBA"), or simply a PCB.

A processor, a communication module, various interfaces, a power management module, and the like may be mounted on the main circuit board 30 in the form of an IC chip. In addition, the sensor controller 380 for controlling the force sensor 300 may be formed as an IC chip and mounted at the main circuit board 30. For example, the sensor controller 380 may be part of the processor described above.

The housing 20 may be disposed below the main circuit board 30 to support the bracket 40 and accommodate each component of the display device 10. For example, the housing 20 may form an inner appearance and/or an outer appearance of the display device 10. The housing 20 may also be referred to as a rear case, a rear plate, or the like. The housing 20 may include an area that is not exposed to the outside of the display device 10, and an area that is exposed to the outside of the display device 10. For example, the area that is not exposed to the outside of the display device 10 may include a plastic injection material, and the area exposed to the outside of the display device 10 may include metal. The exposed area at the side surface of the display device 10 includes a metal material may be referred to as a metal bezel. According to an exemplary embodiment of the present invention, at least a portion of the metal bezel may be utilized as an antenna radiator for transmitting and receiving a signal of a specified frequency.

According to exemplary embodiments of the present invention, the display device 10 may omit at least one of the above-described components or may further include at least one other component. According to an exemplary embodiment of the present invention, the display device 10 may further include a touch sensing layer. The touch sensing layer may be laminated between the cover window 60 and the display panel 100, and may include a touch sensor capable of sensing contact or access of a touch object, e.g., a user's body part or an electronic pen. In addition, the touch sensing layer may be included in the display panel 100. In addition, the display device 10 may further include a battery capable of supplying power to the display device 10.

Hereinafter, the display panel 100, the PCB 200, and the force sensor 300 will be described in detail with reference to FIGS. 3, 4, and 5.

Figure 3:
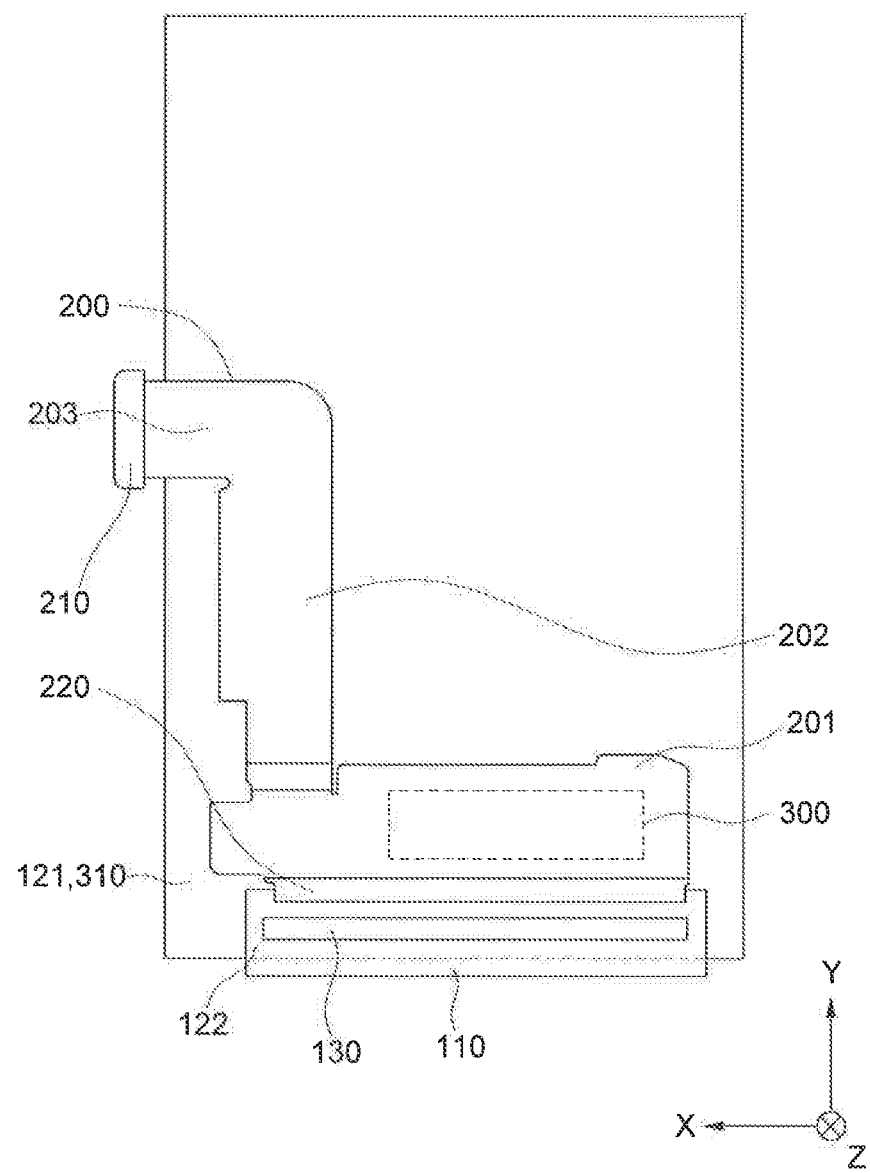
FIG. 3 is a plan view illustrating a back surface of a display panel according to an exemplary embodiment of the present invention.
Figure 4A:
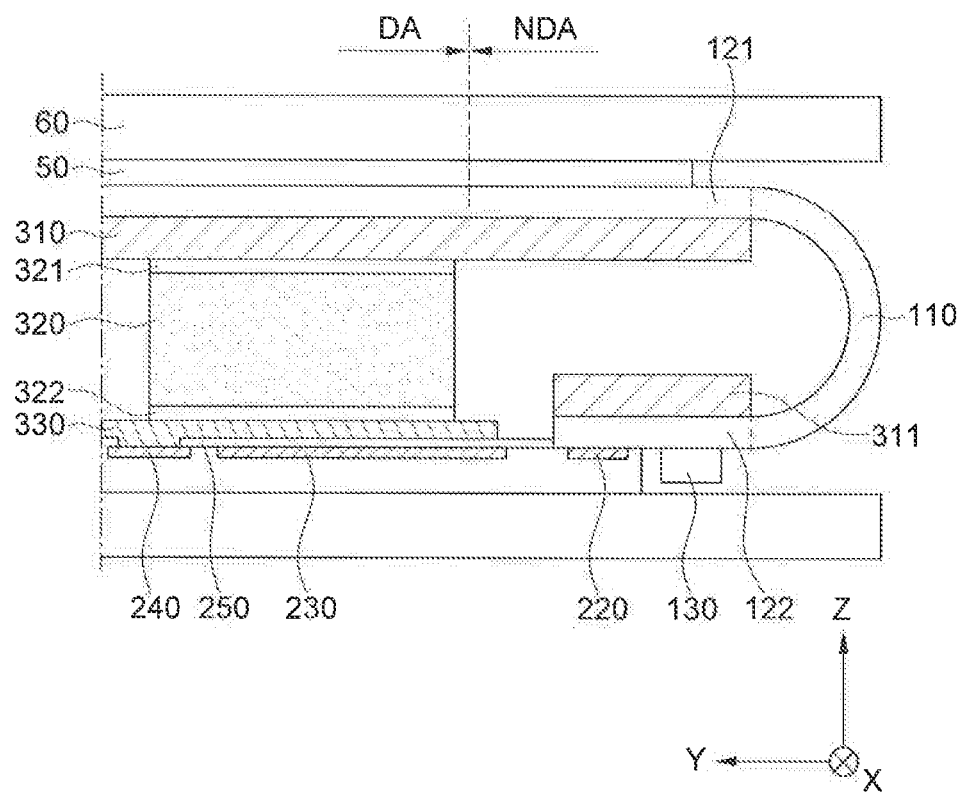
FIG. 4A is a cross-sectional view taken along line I-I' of FIG. 3.
Figure 4B:
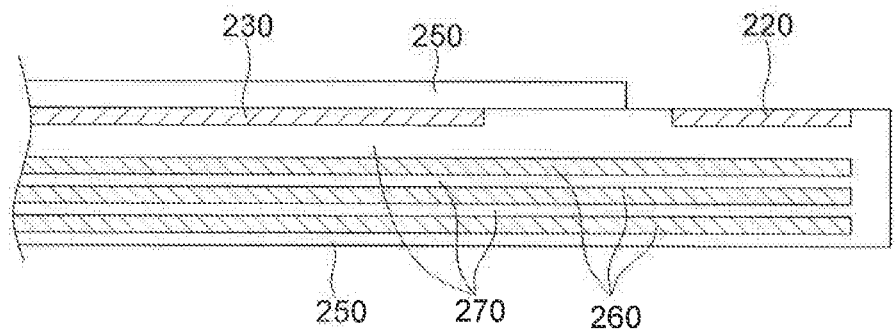
FIG. 4B is a view enlarging a printed circuit board ("PCB") according to an exemplary embodiment of the present invention.
Figure 5:
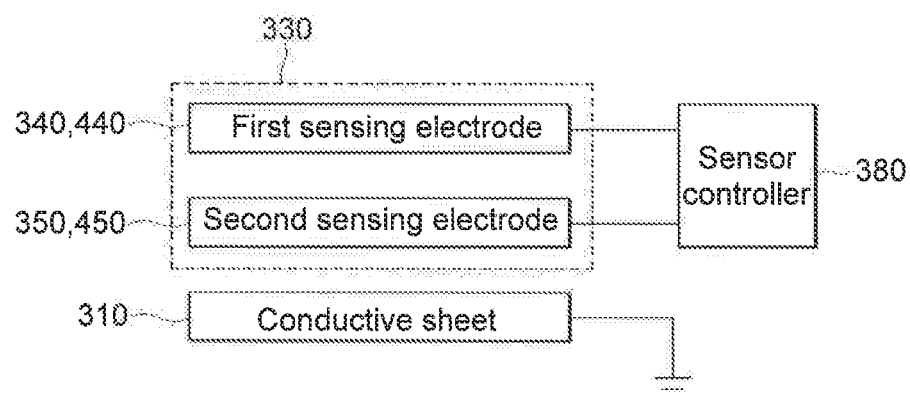
FIG. 5 is a block diagram illustrating a force sensor according to an exemplary embodiment of the present invention.

FIG. 3 is a plan view illustrating a back surface of the display panel 100 according to an exemplary embodiment of the present invention, FIG. 4A is a cross-sectional view taken along line I-I' of FIG. 3, FIG. 4B is a view enlarging the PCB 200 according to an exemplary embodiment of the present invention, and FIG. 5 is a block diagram illustrating the force sensor 300 according to an exemplary embodiment of the present invention.

The display panel 100 is disposed below the cover window 60 and may display various contents. The display panel 100 may include a substrate, a plurality of pixels disposed on one surface of the substrate, and at least one conductive line electrically connected to the pixels. The substrate may include a flexible material so that at least a portion (e.g., a bending portion 110) thereof may be bent in a direction toward a rear surface. The conductive line may include at least one gate line or at least one data line. According to an exemplary embodiment of the present invention, the plurality of gate lines and the plurality of data lines may be arranged in a matrix, and the plurality of pixels may be arranged adjacent to points where the gate and data lines intersect each other and electrically connected to the gate and data lines.

Referring to FIG. 4A, the display panel includes a display area DA and a non-display area NDA around the display area DA.

The display area DA is an area for displaying an image on a screen. A planar shape of the display area DA may be a quadrangle or a quadrangle with rounded corners. The planar shape of the display area DA is not limited to a quadrangle, but may have a circular shape, an elliptical shape, or various other shapes. The display area DA includes an active area including a plurality of pixels.

The non-display area NDA is disposed around the display area DA. The non-display area NDA may form an edge of the display device 10.

A driver for driving a pixel circuit of the display area DA may be disposed at the non-display area NDA. The driver may include a driving circuit 130 and a driving wiring for transmitting driving signals.

According to exemplary embodiments of the present invention, the driving circuit 130 may include a driver IC that provides driving signals and image signals to the display panel 100, or a timing controller (T-con) for controlling the driving signals and the image signals. The driver IC may include a gate driver IC for sequentially selecting gate signal lines of the display panel 100 and applying scan signals (or driving signals) thereto, and a data driver IC (or a source driver IC) for applying image signals to a data signal line of the display panel 100. According to an exemplary embodiment of the present invention, when the gate driver IC selects the gate signal line and applies a scan signal to change a corresponding pixel to an active state, the data driver IC may apply an image signal to the corresponding pixel through the data signal line. The timing controller may control a transmission time of the signal transmitted to the data driver IC, and prevent a display time difference that may occur during a process of outputting the signal to the display panel 100.

The display device 10 may include a polarizing film 50 disposed on a display surface of the display panel 100. The polarizing film 50 may be attached on the display surface of the display panel 100 using an adhesive layer. The polarizing film 50 may cover an entire portion of the display area DA. In addition, the polarizing film 50 may extend outward from an outer edge of the display area DA to cover at least a portion of the non-display area NDA.

According to an exemplary embodiment of the present invention, the display panel 100 may include flat portions 121 and 122 and a bending portion 110. The flat portion may include an upper flat portion 121 and a lower flat portion 122 which overlap each other in a thickness direction (Z-axis direction), and the bending portion 110 may be disposed between the upper and lower flat portions 121 and 122. The bending portion 110 may be bent in a direction opposite to a display direction (e.g., in the case of a top emission type display, in a direction toward a lower surface) with respect to the upper flat portion 121. The bending portion 110 may be disposed on at least one side of the upper flat portion 121. Although the bending portion 110 is depicted as being disposed adjacent to a lower edge of the upper flat portion 121, the present invention is not limited thereto. In an exemplary embodiment of the present invention, the bending portion 110 may be disposed on two or more edges of the upper flat portion 121, for example, on the lower edge and an upper edge of the upper flat portion 121. In an exemplary embodiment of the present invention, a position of the bending portion 110 may be adjacent to other edges such as a left edge, a right edge, and an upper edge other than the lower edge of the upper flat portion 121.

The display area DA and a part of the non-display area NDA may be disposed at the upper flat portion 121. Another part of the non-display area NDA may be disposed at the bending portion 110 and the lower flat portion 122. For example, if at least a portion of the non-display area NDA is bent in the direction opposite to the display direction, the bezel of the display device 10 may be reduced.

A driving signal wiring for transmitting a driving signal from the driving circuit 130 may be disposed at the non-display area NDA adjacent to a lower edge of the display area DA. As illustrated in FIGS. 3 and 4A, the driving circuit 130 may be directly mounted at the non-display area NDA of the lower flat portion 122 or the bending portion 110, and may be connected to the driving signal wiring. Alternatively, the PCB 200 to which the driving circuit 130 is mounted may be attached to the lower flat portion 121 or the bending portion 110 of the display panel 100 so that the driving circuit 130 and the driving signal wiring at the non-display area NDA may be electrically connected to each other.

The driving circuit 130 or the PCB 200 may be electrically connected to a pad of the non-display area NDA, at which the driving signal wiring is exposed, using an anisotropic conductive film or the like.

A bending protection layer may be disposed at the bending portion 110. The bending protection layer may cover the bending portion 110 to protect the substrate and the driving signal wiring that is bent, and alleviate a bending stress. The bending protection layer may be partly removed from an area where the driving circuit 130 and the PCB 200 of the lower flat portion 122 are mounted, thereby exposing a driving signal wiring pad.

Referring to FIG. 3, the PCB 200 includes a driving wiring pad 220 connected to the lower flat portion 122 of the display panel 100, and a driving wiring pad 210 connected to the main circuit board 30. The PCB 200 may include a horizontal portion 201 extending in a direction (X-axis direction) parallel to an edge of the lower flat portion 122, a vertical portion 202 extending in a direction (Y-axis direction) perpendicular to the horizontal portion 201, and a connection portion 203 extending again in a direction (X-axis direction) perpendicular to the vertical portion 202. The driving wiring pad 220 connected to the display panel 100 is disposed at one end of the horizontal portion 201, and the driving wiring pad 210 connected to the main circuit board 30 is disposed at one end of the connection portion 203. Another end of the horizontal portion 201 and another end of the connection portion 203 are connected to the vertical portion 202. Wirings connected to the driving wiring pad 220 that is connected to the display panel 100, and/or wirings connected to the driving wiring pad 210 that is connected to the main circuit board 30 are disposed at the horizontal portion 201, the vertical portion 202, and the connection portion 203. As illustrated in FIG. 4B, these wirings may have a multilayer structure.

Referring to FIGS. 3 and 4A, the force sensor 300, for example, the sensing electrode 330, is disposed on (or in, see FIG. 12) the horizontal portion 201 of the PCB 200, and may overlap the display area DA of the display panel 100 in a plan view. However, the present invention is not limited thereto, and the sensing electrode 330 may be disposed on or in the vertical portion 202 of the PCB 200, and may overlap the non-display area NDA of the display panel 100 in a plan view.

Referring to FIG. 4B, the PCB 200 includes a plurality of wiring layers 260, an insulating layer 270 between each of the wiring layers 260, and a cover layer 250 covering an outer portion of the PCB 200.

Referring to FIGS. 4A and 4B, a wiring layer most adjacent to the display panel 100 (hereinafter, "an outermost wiring layer") includes the driving wiring pads 210 and 220, a shielding layer 230, sensing electrode pads 240, 241 and 242, and sensing electrode connection wirings 243 and 244. The driving wiring pads 210 and 220 and the sensing electrode pads 240, 241, and 242 are not covered by the cover layer 250 and are exposed. The shielding layer 230 and the sensing electrode connection wirings 243 and 344 may be covered and insulated by the cover layer 250.

The driving wiring pads 210 and 220, the shielding layer 230, the sensing electrode pads 240, 241 and 242, and the sensing electrode connection wirings 243 and 244 may be formed by various methods such as a patterning process.

The outermost wiring layer (e.g., the driving wiring pads 210 and 220, the shielding layer 230, the sensing electrode pads 240, 241, and 242, and the sensing electrode connection wirings 243 and 244), and the wiring layer 260 therebelow may be insulated by the insulating layer 270 disposed therebetween.

The insulating layer 270 includes various insulating materials such as polyimide, polyester, glass epoxy, or prepreg. In an exemplary embodiment of the present invention, the insulating layer 270 may be formed in a square, a quadrangle, and various shapes depending on the application to which the insulating layer 270 is applied.

The PCB 200 may include the plurality of wiring layers 260 separated from each other by the insulating layer 270. The outermost wiring layers 210, 220, 230, 240, 241, and 242 or the wiring layer 260 (hereinafter, "a lower wiring layer") below the outermost wiring layer may be formed through a patterning process. A wiring disposed at the lower wiring layer 260 may be connected to a wiring disposed at another lower wiring layer 260 or the driving wiring pads 210 and 220 of the outermost wiring layer through a contact hole at the insulating layer 270.

Signals for driving the force sensor 300 and signals output from the force sensor 300 may be applied to the wirings of the outermost wiring layers 210, 220, 230, 240, 241, and 242. The lower wiring layer 260 may connect the display panel 100 and the main circuit board 30, and apply, for example, signals for driving the display panel 100, data signals for enabling images to be displayed on the display panel 100, driving signals and output signals of a touch sensing layer that is included in the display panel 100 or disposed on the display panel 100, and a power.

In an exemplary embodiment of the present invention, in the patterning process, a photosensitive layer, e.g., a photosensitive dry film, is first coated on a copper foil layer. Next, the photosensitive dry film is exposed using an exposure apparatus, the exposed copper layer is developed with a developer, and then, a predetermined pattern is formed through etching, thereby forming patterns for the outermost wiring layers 210, 220, 230, 240, 241, and 242, and the lower wiring layer 260.

The cover layer 250, e.g., a cover film, is formed on the outermost wiring layers 210, 220, 230, 240, 241, and 242. In an exemplary embodiment of the present invention, the cover layer 250 is formed on a front surface of the outermost wiring layers 210, 220, 230, 240, 241, and 242, and protects and insulates a circuit pattern from the outside. However, the cover layer 250 is not disposed on at least a portion of the driving wiring pads 210 and 220 and the sensing electrode pads 240, 241 and 242 of the outermost wiring layer. In this case, the portion of the driving wiring pads 210 and 220 and the sensing electrode pads 240, 241 and 242 of the outermost wiring layer are exposed.

In an exemplary embodiment of the present invention, the cover layer 250 has an opening for exposing at least a portion of the driving wiring pads 210 and 220 and the sensing electrode pads 240, 241 and 242 of the outermost wiring layer. The cover layer 250 may be formed at a part of a peripheral area of the driving wiring pads 210 and 220 and the sensing electrode pads 240, 241, and 242 and overlap a part of the driving wiring pads 210 and 220 and the sensing electrode pads 240, 241, and 242.

The cover layer 250 may also be formed on a back surface of the PCB 200, in other words, over an entire surface of the outermost wiring layers 210, 220, 230, 240, 241 and 242 on the side opposite from the front surface of the outermost wiring layers 210, 220, 230, 240, 241 and 242.

As such, the cover layer 250 disposed on the front surface of the PCB 200 and may expose at least a portion of the driving wiring pads 210 and 220 and the sensing electrode pads 240, 241, and 242. Accordingly, the PCB 200 may be electrically connected to the main circuit board 30 or the display panel 100 through the driving wiring pads 210 and 220, and may be electrically connected to the force sensor 300, and more specifically, the sensing electrode 330, through the sensing electrode pads 240, 241, and 242.

Referring again to FIG. 4A, the force sensor 300 is disposed between the display panel 100 and the PCB 200.

For example, the conductive sheet 310 is attached below the upper flat portion 121 using an adhesive layer. The conductive sheet 310 may be attached to the display area DA or over an entire surface of the upper flat portion 121. The conductive sheet 310 may extend from the upper flat portion 121 to a boundary of the bending portion 110. The conductive sheet 310 may be grounded as described below.

Referring to FIG. 4A, the conductive sheet 311 may also be attached below the lower flat portion 122 of the display panel 100, using an adhesive layer. The conductive sheet 311 therebelow may extend from the lower flat portion 122 to a boundary of the bending portion 110.

The conductive sheets 310 and 311 may support the flat portions 121 and 122 of the display panel 100, and enable the bending portion 110 to maintain a gentle curve having a constant curvature.

In addition, the conductive sheets 310 and 311 may serve as a heat radiation sheet or may include a heat radiation sheet. For example, the conductive sheets 310 and 311 may include a graphite sheet including graphite and/or a copper sheet including copper. Alternatively, the conductive sheets 310 and 311 may have a multilayer structure in which a graphite sheet and/or a copper sheet are laminated. However, the present invention concept is not limited thereto, and the conductive sheet may include metals having high conductivity and high thermal conductivity, such as nickel, gold, and silver. For example, the conductive sheet 310 has a thermal conductivity in an X-Y direction in a range from about 100 W/mK to about 400 W/mK, and has a thermal conductivity in a Z-axis direction in a range from about 1 W/mK to 30 W/mK.

In an exemplary embodiment of the present invention, the conductive sheet 310 may be a single-layer or multilayer composite sheet that has conductivity, supports the display panel 100, and serves as a heat radiation sheet to dissipate the heat emitted by the display panel 100.

Figure 12:
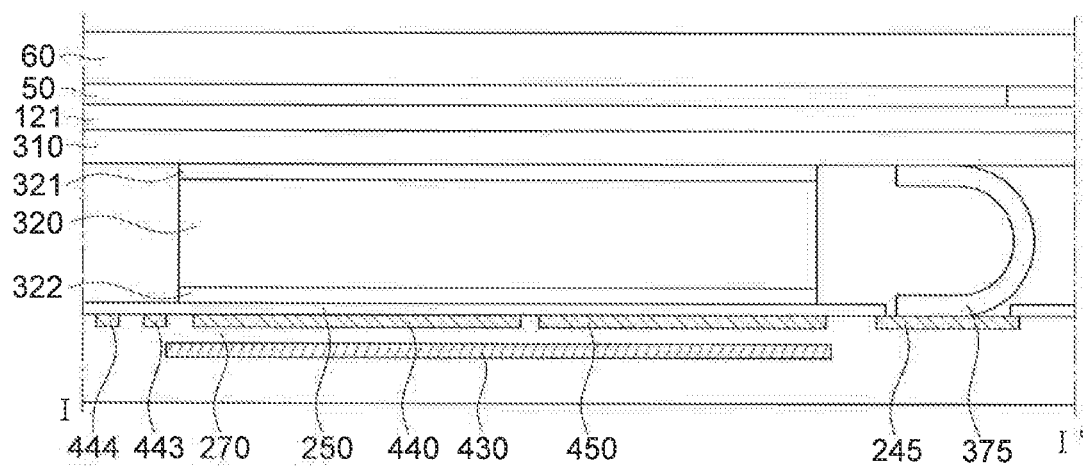
FIG. 12 is a cross-sectional view taken along line I-I' of FIG. 10 according to an exemplary embodiment of the present invention.

The sensing electrode 330 is attached to an upper surface of the PCB 200, and more specifically, on the cover layer 250, and is attached and electrically connected to the sensing electrode pad 240 through an opening at the cover layer 250. However, the present invention is not limited thereto, and as illustrated in FIG. 12, the sensing electrodes 440 and 450 may be disposed in the PCB 200 and may be covered by the cover layer 250. At least a portion or an entirety of the sensing electrode 330 may overlap the conductive sheet 310 in a plan view. The sensing electrode 330 may include at least two sensing electrodes 340 and 350 that are separated from each other.

The sensing electrode 330 may include a conductive material. The conductive material of the sensing electrode 330 may include a metal or an alloy thereof. The metal may include, for example, gold (Au), silver (Ag), aluminum (Al), molybdenum (Mo), chromium (Cr), titanium (Ti), nickel (Ni), neodymium (Nd), copper (Cu), or platinum (Pt). In an exemplary embodiment of the present invention, the sensing electrode 330 may include a transparent conductive material. Examples of the transparent conductive material may include silver nano wire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, and graphene. The sensing electrode 330 may have a single layer or multilayer structure.

The elastic element 320 is disposed between the conductive sheet 310 and the sensing electrode 330. For example, one surface of the elastic element 320 may contact the conductive sheet 310, and another surface of the elastic element 320 may contact the sensing electrode 330. In addition, adhesive layers 321 and 322 may be disposed between the elastic element 320 and the sensing electrode 330 and between the elastic element 320 and the conductive sheet 310, respectively. The elastic element 320 may overlap the conductive sheet 310 and the sensing electrode 330 in a plan view. The elastic element 320 may have a shape corresponding to a shape of the sensing electrode 330 in a plan view.

However, the present invention is not limited thereto, and the elastic element 320 may not overlap the conductive sheet 310 or the sensing electrode 330 in a plan view. For example, the elastic element 320 may be disposed on the outside of the sensing electrode 330, between the conductive sheet 310 and the PCB 200, in a plan view. In addition, the elastic element 320 may not overlap the PCB 200 in a plan view. The elastic element 320 may be disposed at any position where a distance between the conductive sheet 310 and the sensing electrode 330 may vary according to a pressure applied to the cover window 60. For example, the elastic element 320 may be the cover window 60, and an air or any dielectric element may be located between the conductive sheet 310 and the sensing electrode 330.

The elastic element 320 may mitigate external impact, and may have an elastic force to perform such a role. For example, the elastic element 320 may be deformed by a pressure applied from the outside, and may have an elastic force that allows the elastic element 320 to be restored to its original state when the pressure from the outside is removed.

In addition, the elastic element 320 may have an insulating property to prevent an electric short between the conductive sheet 310 and the sensing electrode 330. The elastic element 320 may be provided as a porous polymer to have an elastic force. For example, the elastic element 320 may be provided in the form of foam, such as a sponge.

For example, the elastic element 320 may include thermoplastic elastomers, polystyrene, polyolefin, polyurethane thermoplastic elastomers, polyamide, synthetic rubbers, polydimethylsiloxane, polybutadiene, polyisobutylene, poly (styrenebutadienestyrene), polyurethane, polychloroprene, polyethylene, and silicone, and combinations thereof, but the present invention is not limited thereto.

FIG. 5 is a block diagram illustrating a function of the force sensor 300 according to an exemplary embodiment of the present invention.

As described above, the force sensor 300 may be electrically connected to the PCB 200 and disposed between the display panel 100 and the PCB 200. The force sensor 300 includes the first conductor, for example, the conductive sheet 310, the second conductor, for example, the sensing electrode 330, the elastic element 320 between the conductive sheet 310 and the sensing electrode 330, and the sensor controller 380 electrically connected to the sensing electrode 330.

As described above, the sensing electrode 330 may include at least two sensing electrodes 340 and 350 that are separated from each other, and the sensor controller 380 may be electrically connected to each of the sensing electrodes 340 and 350.

The conductive sheet 310 and the sensing electrode 330 may function as a capacitor, and a capacitance may be formed between the conductive sheet 310 and the sensing electrode 330. The sensor controller 380 may detect a magnitude of the pressure applied to the cover window 60 based on a change in capacitance between the conductive sheet 310 and the sensing electrode 330. For example, a distance between the conductive sheet 310 and the sensing electrode 330 may be changed by the pressure applied to the cover window 60. Since the capacitance between the conductive sheet 310 and the sensing electrode 330 changes according to the distance between the conductive sheet 310 and the sensing electrode 330, the magnitude of the pressure applied to the cover window 60 may be detected based on the change in capacitance between the conductive sheet 310 and the sensing electrode 330.

For example, when a pressure is not applied to the force sensor 300 or the cover window 60, a first capacitance may be formed between the conductive sheet 310 and the sensing electrode 330. When a pressure is applied to the cover window 60 due to a touch of a user or the like, a thickness of the elastic element 320 is changed, and thus, the distance between the conductive sheet 310 and the sensing electrode 330 is changed. Accordingly, the capacitance between the conductive sheet 310 and the sensing electrode 330 may change. For example, the first capacitance may be changed to the second capacitance by the applied pressure.

Accordingly, as the external pressure increases, the capacitance of the conductive sheet 310 and the sensing electrode 330 may also increase. Accordingly, the magnitude of the pressure or the like may be detected from an amount of change in capacitance generated in the force sensor 300.

The pressure applied to the force sensor 300 may be generated by a user's touch. However, the present invention is not limited thereto, and the pressure may be caused by various other things.

The sensor controller 380 may detect the pressure applied to the force sensor 300 or the cover window 60 by sensing an amount of change in capacitance ($\Delta C$) between the conductive sheet 310 and the sensing electrode 330.

To accomplish this, the sensor controller 380 may be connected to the sensing electrode 330, and the conductive sheet 310 may be grounded. For example, the sensor controller 380 may detect the amount of change in capacitance ($\Delta C$) by using an output signal of the sensing electrode 330.

There may be various methods for detecting the amount of change ($\Delta C$) in capacitance. In addition, the sensor controller 380 may be connected to the conductive sheet 310 and the sensing electrode 330 together, thereby detecting the amount of change ($\Delta C$) in capacitance.

The sensing electrode 330 includes two first sensing electrodes 340 and 440 and two second sensing electrodes 350 and 450 that are separated from each other. However, the present invention is not limited thereto, and the sensing electrode may include three or more sensing electrodes 330 separated from each other, and the plurality of separated sensing electrodes 330 may be arranged along the horizontal portion 201 of the PCB 200.

Each of the separated sensing electrodes 340, 350, 440, and 450 may have a pressure sensing area. The pressure sensing area may be an area to which a touch pressure can be input by a user, and may include not only an area that overlaps the sensing electrodes 340, 350, 440, and 450, but also a surrounding area thereof. For example, referring to FIGS. 7 and 10, respective pressure sensing areas may include areas each overlapping the sensing electrodes 340, 350, 440, and 450, and may further include peripheral display areas DA that do not overlap the sensing electrodes 340, 350, 440, and 450.

Hereinbelow, a force sensor according to an exemplary embodiment of the present invention will be described in detail with reference to FIGS. 6 to 9.

Figure 6:
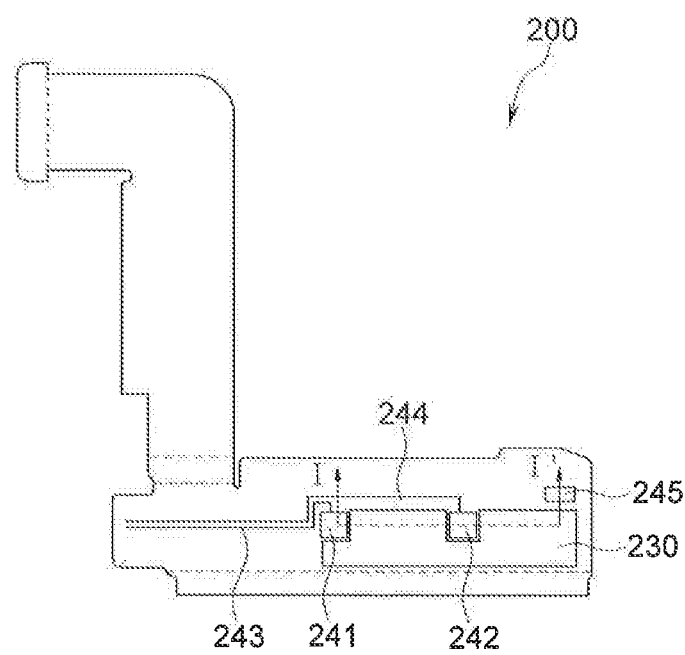
FIG. 6 is a plan view illustrating an outermost wiring layer of a PCB according to an exemplary embodiment of the present invention.
Figure 7:
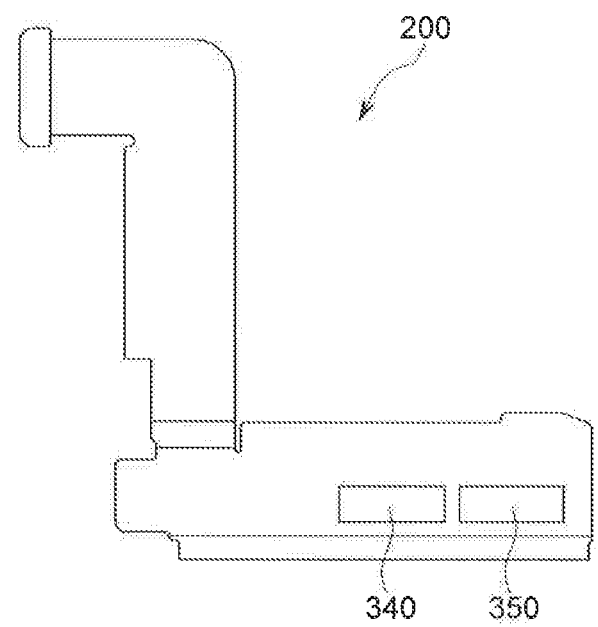
FIG. 7 is a plan view illustrating a sensing electrode disposed on a PCB according to an exemplary embodiment of the present invention.
Figure 8:
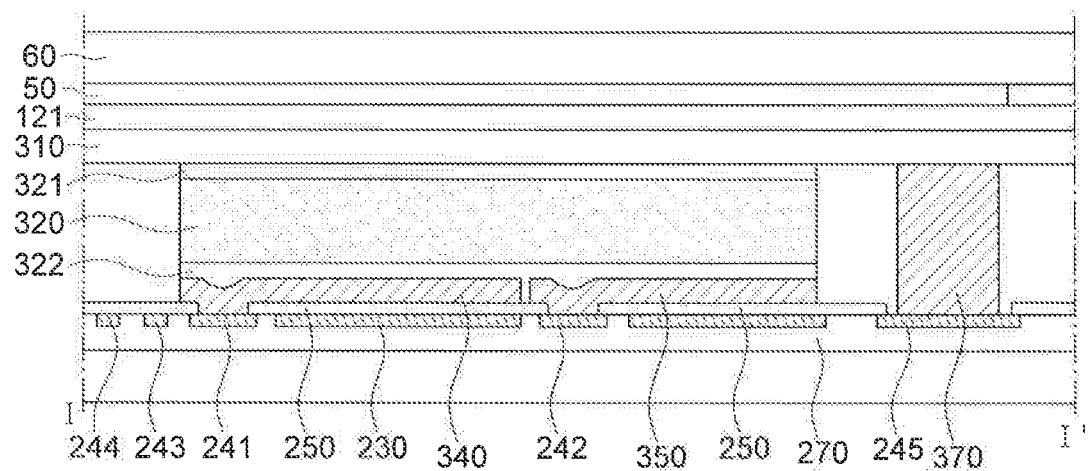
FIGS. 8 and 9 are cross-sectional views taken along line I-I' of FIG. 6 according to exemplary embodiments of the present invention.
Figure 9:
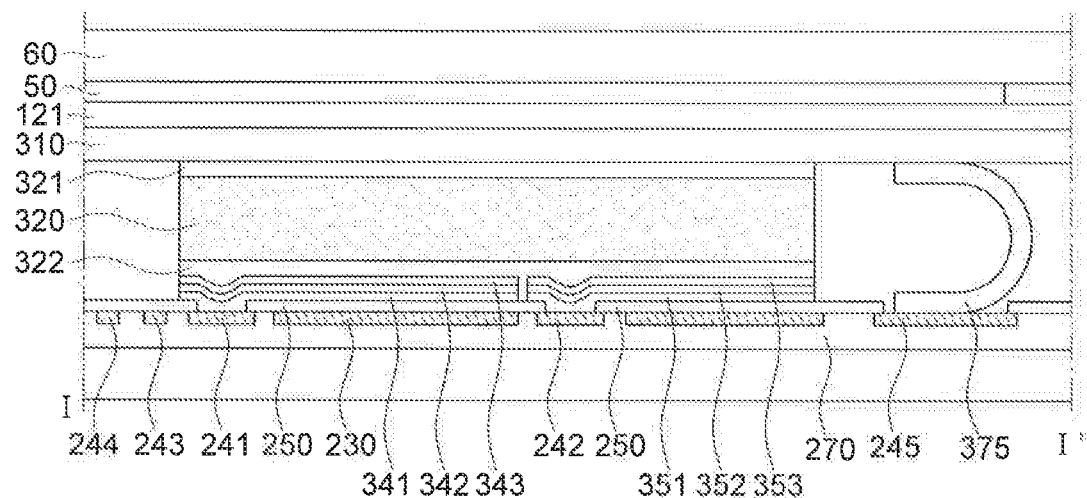

FIG. 6 is a plan view illustrating an outermost wiring layer of a PCB according to an exemplary embodiment of the present invention, FIG. 7 is a plan view illustrating a sensing electrode disposed on a PCB according to an exemplary embodiment of the present invention, and FIGS. 8 and 9 are cross-sectional views taken along line I-I' of FIG. 6 according to exemplary embodiments of the present invention.

The description of the display panel 100, the conductive sheet 310, the elastic element 320 and the adhesive layers 321 and 322 have been given hereinabove, and thus may not be described again; however, the sensing electrode 330 and the PCB 200 will be mainly described hereinbelow.

As described above, FIG. 6 shows the outermost wiring layer of the PCB 200, more specifically, a wiring layer immediately below the cover layer 250 of the PCB 200 opposing the display panel 100. FIG. 7 shows the sensing electrodes 340 and 350 disposed on an upper surface of the PCB 200 facing toward the display panel 100, and more specifically, on the cover layer 250 of the PCB 200.

First, referring to FIG. 7, the first sensing electrode 340 and the second sensing electrode 350 are disposed apart from each other along the horizontal portion 201 of the PCB 200. For example, the first sensing electrode 340 and the second sensing electrode 350 may be symmetric with respect to a center of the display area DA in the X-axis direction. Alternatively, a third sensing electrode may be further provided, and the first sensing electrode 340 may be disposed at a center of the display area DA in the X-axis direction (e.g., a left and right direction in FIG. 7), and the second sensing electrode 350 and the third electrode may be symmetric with respect to the first sensing electrode 340.

Each of the first and second sensing electrodes 340 and 350 overlaps the conductive sheet 310 in a plan view. Each of the first and second sensing electrodes 340 and 350 may be electrically separated from each other, and may have different amounts of change in capacitance depending on the location of the touch pressure input through the cover window 60. Accordingly, the location of the touch may be estimated according to the capacitance of each of the first and second sensing electrodes 340 and 350.

Referring to FIG. 7, each of the first and second sensing electrodes 340 and 350 has substantially the same quadrangular shape. However, the present invention is not limited thereto, and each of the first and second sensing electrodes 340 and 350 may have any shape, e.g., a circle, an ellipse, and a polygon.

Referring to FIG. 8, each of the first and second sensing electrodes 340 and 350 may be attached to the elastic element 320 using the adhesive layer 322.

Each of the first and second sensing electrodes 340 and 350 is disposed on an upper surface of the PCB 200, more specifically, on the cover layer 250. The cover layer 250 covers the upper surface of the PCB 200, and has an opening that exposes at least a portion of the sensing electrode pads 241 and 242 and at least a portion of a ground pad 245. The first and second sensing electrodes 340 and 350 are electrically connected to the sensing electrode pads 241 and 242, respectively, through openings of the cover layer 250. For example, the first sensing electrode 340 contacts the sensing electrode pad 241, and the second sensing electrode 350 contacts the sensing electrode pad 242.

Referring to FIG. 6, the sensing electrode pads 241 and 242 are connected to the sensor controller 380 through the sensing electrode connection wirings 243 and 244, respectively. The sensing electrode connection wirings 243 and 244 may be connected to the driving wiring pads 210 and 220, respectively. For example, the first and second sensing electrodes 340 and 350 may be electrically connected to the sensor controller 380 through the sensing electrode pads 241 and 242 and the sensing electrode connection wirings 243 and 244, respectively.

The shielding layer 230 that overlaps, in a plan view, at least a portion of the first and second sensing electrodes 340 and 350, and for example, the entirety of the first and second sensing electrodes 340 and 350, may be disposed at the outermost wiring layer. The shielding layer 230 may be completely covered by the cover layer 250, and may be insulated from the first and second sensing electrodes 340 and 350. In addition, the shielding layer 230 may be electrically insulated and separated from the sensing electrode pads 241 and 242 and the sensing electrode connection wirings 243 and 244. In addition, the shielding layer 230 may enclose the sensing electrode pads 241 and 242 and/or the sensing electrode connection wirings 243 and 244.

The shield layer 230 is disposed on a back surface of the cover layer 250, and may have a shape that entirely overlaps the first and second sensing electrodes 340 and 350. The shielding layer 230 shields electromagnetic waves and noise signals, generated from circuits disposed below the first and second sensing electrodes 340 and 350, e.g., the PCB 200 and the main circuit board 30, from affecting the first and second sensing electrodes 340 and 350. In addition, the shielding layer 230 prevents formation of a parasitic capacitance between the first and second sensing electrodes 340 and 350 and another wiring layer 260 of the PCB 200. The electric potential of the shielding layer 230 may always be maintained at a ground level. The shielding layer 230 may be connected to the ground pad 245. The ground pad 245 may always maintain its electric potential at the ground level.

As illustrated in FIG. 8, the first and second sensing electrodes 340 and 350 are formed on the PCB 200 at which the cover layer 250 having an opening is disposed, and are attached to the elastic element 320 using the adhesive layer 322. Accordingly, the display panel 100, the force sensor 300, and the PCB 200 may be attached to each other.

As illustrated in FIG. 8, according to an exemplary embodiment of the present invention, the first and second sensing electrodes 340 and 350 may be formed by applying or printing a conductive paste. The conductive paste is prepared by mixing a film-forming agent and a metal powder. Examples of the film-forming agent may include epoxies using cross-linking properties; liquids such as linseed oil, soybean oil, lacquer, tung oil, and synthetic drying oil; natural resins such as shellac and copal; processed resins such as limed rosin; synthetic resins such as phenol resins, urea resins, melamine resins, and vinyl resins; cellulose derivatives such as nitrocellulose and acetylcellulose; rubber derivatives such as synthetic rubber; polyvinyl alcohol; and solids, such as casein, that melt in a solvent.

Examples of the metal powder of the conductive paste may include gold, silver, platinum, palladium, and copper having high electric conductivity.

As illustrated in FIG. 9, according to another exemplary embodiment of the present invention, each of the first and second sensing electrodes 340 and 350 may include a conductive tape. The conductive tape includes adhesive layers 341 and 351, conductive layers 342 and 352, and insulating layers 343 and 353. The insulating layers 343 and 353 may be omitted. The adhesive layers 341 and 351 have conductivity, and may physically/electrically connect the conductive layers 342 and 352 of the sensing electrodes 340 and 350 to the sensing electrode pads 241 and 242, respectively.

Each of the conductive layers 342 and 352 and the adhesive layers 341 and 351 of the conductive tape may include a conductive fiber and a pressure-sensitive adhesive. A conductive fiber, aluminum, copper, nickel foil, or the like may be used as a base of the conductive layers 342 and 352, and one of the adhesive layers 341 and 351 may be provided on one surface of the conductive layers 342 and 352.

The conductive layers 342 and 352 may be formed including various compositions such as Ni, Cu, Cu+Ni, Cu+Ni+Gold, Cu+Ni+other metals, Cu+Ni+Resin, and the like, using an electroless plating method.

Referring to FIGS. 8 and 9, conductors 370 and 375 are disposed between the conductive sheet 310 and the ground electrode 245 to electrically connect the conductive sheet 310 and the ground electrode 245. The conductors 370 and 375 include a conductive sponge 370 illustrated in FIG. 8 and a conductive tape 375 illustrated in FIG. 9. However, the present invention is not limited thereto, and the conductors 370 and 375 may include any conductive material that contracts or changes its shape in accordance with deformation of the elastic element 320.

Referring to FIG. 8, one end of the conductive sponge 370 is attached to the conductive sheet 310, and another end of the conductive sponge 370 is attached to the ground pad 245 exposed through the opening of the cover layer 250.

The conductive sponge 370 may have a shape of a column that has a cross-section of a polygon, for example, a circle, an ellipse, or a quadrangle, in a plan view. The conductive sponge 370 may have a structure in which copper, nickel, silver, gold, or the like is plated on a foam that has excellent restoring force. A conductive adhesive layer is disposed at one end portion and another end portion of the conductive sponge 370, and the one end portion and the another end portion of the conductive sponge 370 are attached to the conductive sheet 310 and the ground electrode 245, respectively. Accordingly, the conductive sponge 370 electrically connects the conductive sheet 310 and the ground electrode 245 to each other.

Referring to FIG. 9, one end portion of the conductive tape 375 is attached to the conductive sheet 310, and another end portion of the conductive tape 375 is attached to the ground pad 245 exposed through the opening of the cover layer 250. As described above with respect to the conductive tapes 341, 342, 343, 351, 352 and 353 constituting the first and second sensing electrodes 340 and 350, the conductive tape 375 may include an adhesive layer, a conductive layer, and an insulating layer. The insulating layer may be omitted. The adhesive layer has conductivity, and may be attached to each of the conductive sheet 310 and the ground pad 245 to electrically connect the conductive sheet 310 and the ground pad 245 to each other.

Hereinbelow, a force sensor according to an exemplary embodiment of the present invention will be described in detail with reference to FIGS. 10 to 12.

Figure 10:
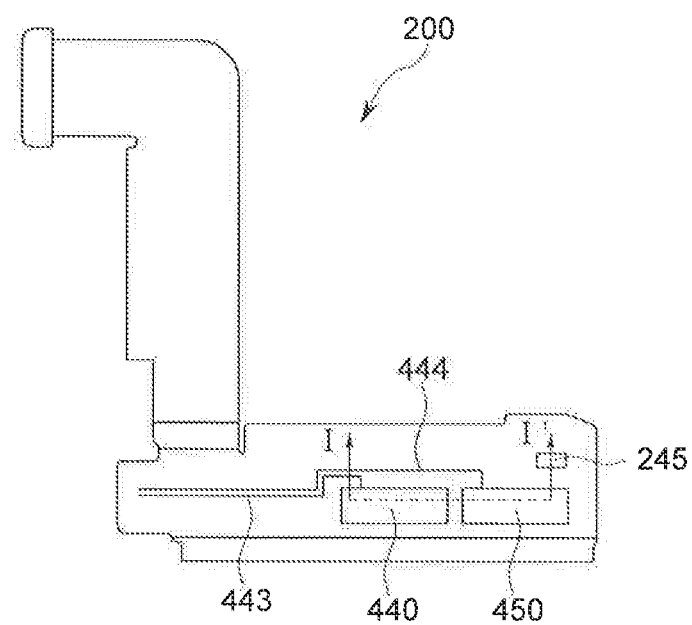
FIG. 10 is a plan view illustrating an outermost wiring layer of a PCB according to an exemplary embodiment of the present invention.
Figure 11:
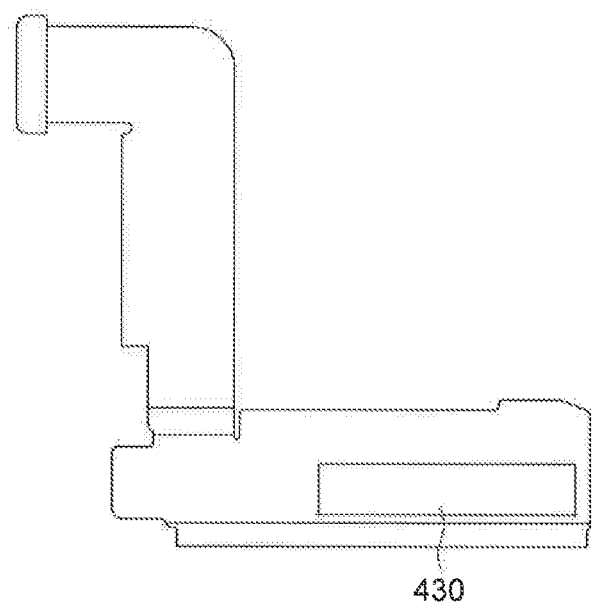
FIG. 11 is a plan view illustrating a lower wiring layer of a PCB according to an exemplary embodiment of the present invention.

FIG. 10 is a plan view illustrating an outermost wiring layer of a PCB 200 according to an exemplary embodiment of the present invention, FIG. 11 is a plan view illustrating a lower wiring layer of a PCB 200 according to an exemplary embodiment of the present invention, and FIG. 12 is a cross-sectional view taken along line I-I' of FIG. 10 according to an exemplary embodiment of the present invention.

The description of the display panel 100, the conductive sheet 310, the elastic element 320 and the adhesive layers 321 and 322 given hereinabove will be hereinafter omitted, and the sensing electrode 330 and the PCB 200 will be mainly described.

FIG. 10 shows an outermost wiring layer that is a wiring layer most adjacent to the display panel 100 of the PCB 200, more specifically, sensing electrodes 440 and 450 and sensing electrode connection wirings 443 and 444 disposed immediately below the cover layer 250 of the PCB 200.

FIG. 11 shows a shielding layer 430 disposed at a wiring layer (hereinafter, "a lower wiring layer") immediately below an outermost wiring layer of the PCB 200. However, the present invention is not limited thereto, and another wiring may be interposed between the wiring layer at which the shielding layer 430 is disposed and the outermost wiring layer.

First, referring to FIG. 10, a first sensing electrode 440 and a second sensing electrode 450 are arranged apart from each other along the horizontal portion 201 of the PCB 200. For example, the first sensing electrode 440 and the second sensing electrode 450 may be symmetric with respect to a center of the display area DA in the X-axis direction. Alternatively, a third sensing electrode may be further provided, and the first sensing electrode 440 may be disposed at a center of the display area DA in the X-axis direction (e.g., a left and right direction in FIG. 10), and the second sensing electrode 450 and the third electrode may be symmetric with respect to the first sensing electrode 440.

Each of the first and second sensing electrodes 440 and 450 overlaps the conductive sheet 310 in a plan view. Each of the first and second sensing electrodes 440 and 450 may be electrically separated from each other, and may have different amounts of change in capacitance depending on the location of the touch pressure input through the cover window 60. Accordingly, the location of the touch may be estimated according to the capacitance of each of the first and second sensing electrodes 440 and 450.

Referring to FIG. 10, each of the first and second sensing electrodes 440 and 450 has substantially the same quadrangular shape. However, the present invention is not limited thereto, and each of the first and second sensing electrodes 440 and 450 may have any shape, e.g., a circle, an ellipse, and a polygon.

The first and second sensing electrodes 440 and 450 are connected to the sensor controller 380 through the sensing electrode connection wirings 443 and 444, respectively, disposed at the same outermost wiring layer. The sensing electrode connection wirings 443 and 444 may be connected to the driving wiring pads 210 and 220, respectively. For example, the first and second sensing electrodes 440 and 450 may be electrically connected to the sensor controller 380 through the sensing electrode connection wirings 443 and 444, respectively.

Referring to FIG. 12, the insulating layer 270 may be disposed on back surfaces of the first and second sensing electrodes 440 and 450 and the sensing electrode connecting wirings 443 and 444 to electrically insulate them from the shielding layer 430 and another wiring layer 260.

The cover layer 250 is disposed on upper surfaces of the first and second sensing electrodes 440 and 450 and the sensing electrode connection wirings 443 and 444. The adhesive layer 322 is disposed between the cover layer 250 and the elastic element 320 so that the PCB 200 and the elastic element 320 may be attached to each other.

The cover layer 250 has an opening that exposes at least a portion of the ground pad 245. Referring to FIG. 12, the conductors 370 and 375 are disposed between the conductive sheet 310 and the ground electrode 245 to electrically connect the conductive sheet 310 and the ground electrode 245 to each other. The conductors 370 and 375 include the conductive sponge 370 illustrated in FIG. 8 and the conductive tape 375 illustrated in FIG. 9. However, the present invention is not limited thereto, and the conductors 370 and 375 may include any conductive material that contracts or changes its shape in accordance with deformation of the elastic element 320.

The shielding layer 430 that overlaps, in a plan view, at least a portion of the first and second sensing electrodes 440 and 450 disposed at the outermost wiring layer, and for example, the entirety of the first and second sensing electrodes 440 and 450, may be disposed at the lower wiring layer. The shielding layer 430 may be disposed between two of the insulating layers 270 and may be separated and electrically insulated from the first and second sensing electrodes 440 and 450, the sensing electrode connection wirings 443 and 444, and the wiring layer 260 therebelow.

The shielding layer 430 shields electromagnetic waves and noise signals, generated from circuits disposed below the first and second sensing electrodes 440 and 450, e.g., the PCB 200 and the main circuit board 30, and prevents formation of a parasitic capacitance between the first and second sensing electrodes 440 and 450 and another wiring layer 260 of the PCB 200. The electric potential of the shielding layer 430 may always be maintained at a ground level. The shielding layer 430 may be connected to the ground pad 245 through a contact hole at the insulating layer 270 between the lower wiring layer and the outermost wiring layer. The ground pad 245 may always maintain its potential at the ground level.

As illustrated in FIG. 12, the cover layer 250 is disposed on the PCB 200, and the cover layer 250 is attached to the elastic element 320 using the adhesive layer 322. Accordingly, the display panel 100, the force sensor 300, and the PCB 200 may be attached to each other.

According to an exemplary embodiment of the present invention, the first and second sensing electrodes 440 and 450, the sensing electrode connection wirings 443 and 444, the ground pad 245, and the shielding layer 430 may be formed with substantially same patterning manner as that used for forming the wirings disposed at other wiring layers 260. For example, a copper foil is formed on the insulating layer 270, and the shape of the first and second sensing electrodes 440 and 450, the sensing electrode connection wirings 443 and 444, the ground pad 245, and the shielding layer 430 may be formed through a method such as an additive method, a subtractive method, or a semi-additive method. In addition, as described above, the first and second sensing electrodes 440 and 450, the sensing electrode connection wirings 443 and 444, the ground pad 245, and the shielding layer 430 may be formed by applying or printing a conductive paste.

As set forth hereinabove, in a display device according to one or more exemplary embodiments of the present invention, by forming a sensing electrode of a force sensor on a PCB that is disposed on a back surface of a display panel, and forming a sensing electrode pad and a sensing electrode connection wiring, which connect the sensing electrode and a sensing controller, at an outermost wiring layer of the PCB, or by forming the sensing electrode of the force sensor and the sensing electrode connection wiring, which connects the sensing electrode and the sensing controller, at an outermost wiring layer of the PCB that is disposed on a back surface of the display panel, a separate FPCB for connecting the force sensor and the PCB may be omitted, and the force sensor and the PCB may be connected more robustly.

According to an exemplary embodiment of the present invention, a conductive sheet, e.g., a heat radiation sheet, attached to a back surface of the display panel is used as a conductor of a force sensor, and an amount of change in capacitance between the conductive sheet and the sensing electrode disposed on the PCB may be measured. Accordingly, the structure of the force sensor may be simplified.

While the present invention has been illustrated and described with reference to exemplary embodiments thereof, it will be apparent to those of ordinary skill in the art that various changes in form and detail may be made thereto without departing from the spirit and scope of the present invention as defined by the following claims.

What is claimed is:
1. A display device, comprising:
a display panel;
a printed circuit board connected to the display panel;
an elastic element disposed between the display panel and the printed circuit board;
a first conductor disposed between the elastic element and the printed circuit board; and
a second conductor disposed between the elastic element and the display panel, and forming a capacitance with the first conductor,
wherein the printed circuit board comprises a first pad connected to the first conductor,
wherein the printed circuit board comprises a cover layer having an opening corresponding to the first pad, and the first conductor is directly connected to the first pad through the opening, and
wherein the display panel comprises a first portion comprising a display area, a second portion overlapping the first portion and a bending portion between the first portion and the second portion, and
the printed circuit board is directly connected to the second portion.

2. The display device of claim 1, wherein the first conductor comprises a plurality of conductors separated from each other.

3. The display device of claim 1, wherein the first conductor is a conductive tape.

4. The display device of claim 3, wherein the conductive tape comprises an adhesive layer, a conductive layer, and an insulating layer.

5. The display device of claim 1, wherein the first conductor comprises a conductive paste.

6. The display device of claim 1, wherein the first pad contacts the first conductor.

7. The display device of claim 1, wherein the first pad overlaps the first conductor in a plan view.

8. The display device of claim 1, wherein the first pad is connected to a sensor controller configured to measure a change in the capacitance.

9. The display device of claim 1, wherein the printed circuit board comprises a second pad that is connected to the second conductor and to which a ground voltage is applied.

10. The display device of claim 9, wherein the printed circuit board comprises a cover layer having an opening corresponding to the second pad.

11. The display device of claim 10, further comprising a conductive tape or a conductive sponge that contacts the second pad and the second conductor.

12. The display device of claim 1, wherein the second conductor comprises a sheet that overlaps an entire surface of a display area of the display panel.

13. The display device of claim 12, wherein the second conductor comprises a heat radiation sheet.

14. The display device of claim 1, wherein the printed circuit board comprises a shielding layer that overlaps the first conductor in a plan view.

15. The display device of claim 1, further comprising a bracket configured to support the display panel and the printed circuit board.

16. A display device, comprising:
a display panel;
a printed circuit board connected to the display panel;
an elastic element disposed between the display panel and the printed circuit board;
an adhesive disposed between the elastic element and the printed circuit board; and
a first conductor disposed between the elastic element and the display panel,
wherein the printed circuit board comprises a second conductor that forms a capacitance with the first conductor,
wherein a cover layer is disposed between the adhesive and the second conductor and completely covers the second conductor,
wherein the printed circuit board comprises a first pad that is connected to the first conductor and to which a ground voltage is applied,
wherein the cover layer has an opening corresponding to the first pad, the first pad located at the same level as the second conductor in the printed circuit board, and
wherein the second conductor is adjacent to the first pad.

17. The display device of claim 16, wherein the second conductor is connected to a sensor controller configured to measure a change in the capacitance.

18. The display device of claim 16, wherein the printed circuit board comprises a plurality of wiring layers separated from each other by an insulating layer, and
the second conductor is disposed at a first wiring layer that is closest to the display panel among the plurality of wiring layers.

19. The display device of claim 18, wherein the printed circuit board comprises a shielding layer that is disposed at a second wiring layer adjacent to the first wiring layer, and overlaps the second conductor in a plan view.

20. The display device of claim 16, further comprising a conductive tape or a conductive sponge that contacts the first pad and the first conductor.

21. The display device of claim 16, wherein the first conductor comprises a sheet that overlaps an entire surface of a display area of the display panel.

22. The display device of claim 21, wherein the first conductor comprises a heat radiation sheet.

23. The display device of claim 16, further comprising a bracket configured to support the display panel and the printed circuit board.

24. A display device, comprising:
a display panel;
a printed circuit board connected to the display panel;
a sensing electrode disposed adjacent to the printed circuit board;
a conductive sheet disposed adjacent to the display panel; and
an elastic element disposed between the sensing electrode and the conductive sheet,
wherein the printed circuit board comprises a pad connected to the sensing electrode, and
wherein the display panel, a first portion of the conductive sheet, the elastic element, the sensing electrode and the printed circuit board are arranged in sequence, a second portion of the conductive sheet is disposed on the printed circuit board and faces the first portion of the conductive sheet and the display panel is disposed between the second portion of the conductive sheet and the printed circuit board.

* * * * *